United States Patent
Bauer

[15] 3,661,173
[45] May 9, 1972

[54] HIGH SPEED STOP VALVE

[72] Inventor: Helmut Bauer, Basel, Switzerland

[73] Assignee: Airco, Inc., New York, N.Y.

[22] Filed: Jan. 29, 1970

[21] Appl. No.: 6,817

[30] Foreign Application Priority Data

Jan. 31, 1969 Switzerland .......................... 1553/69

[52] U.S. Cl. ........................... 137/462, 137/464, 137/466
[51] Int. Cl. ........................................................... F16k 17/24
[58] Field of Search ................................ 137/462, 464, 466

[56] References Cited

UNITED STATES PATENTS

| 370,339 | 9/1887 | Johnston | 137/466 |
| 374,485 | 12/1887 | McGaun | 137/462 |
| 424,199 | 3/1890 | Haskell | 137/462 |
| 2,346,223 | 4/1944 | Lyon | 137/462 |
| 2,346,224 | 4/1944 | Lyon | 137/462 |
| 2,707,484 | 5/1955 | Bush | 137/466 X |

FOREIGN PATENTS OR APPLICATIONS

| 458,944 | 8/1949 | Canada | 137/464 |

*Primary Examiner*—Harold W. Weakley
*Attorney*—Francis B. Henry, Edmund W. Bopp and H. Hume Mathews

[57] ABSTRACT

This invention relates to a high-speed valve positioned in a pipe normally conducting liquid oxygen under pressure. The valve is actuated to a closed position when there is a pipe failure with attendant pressure drop.

6 Claims, 1 Drawing Figure

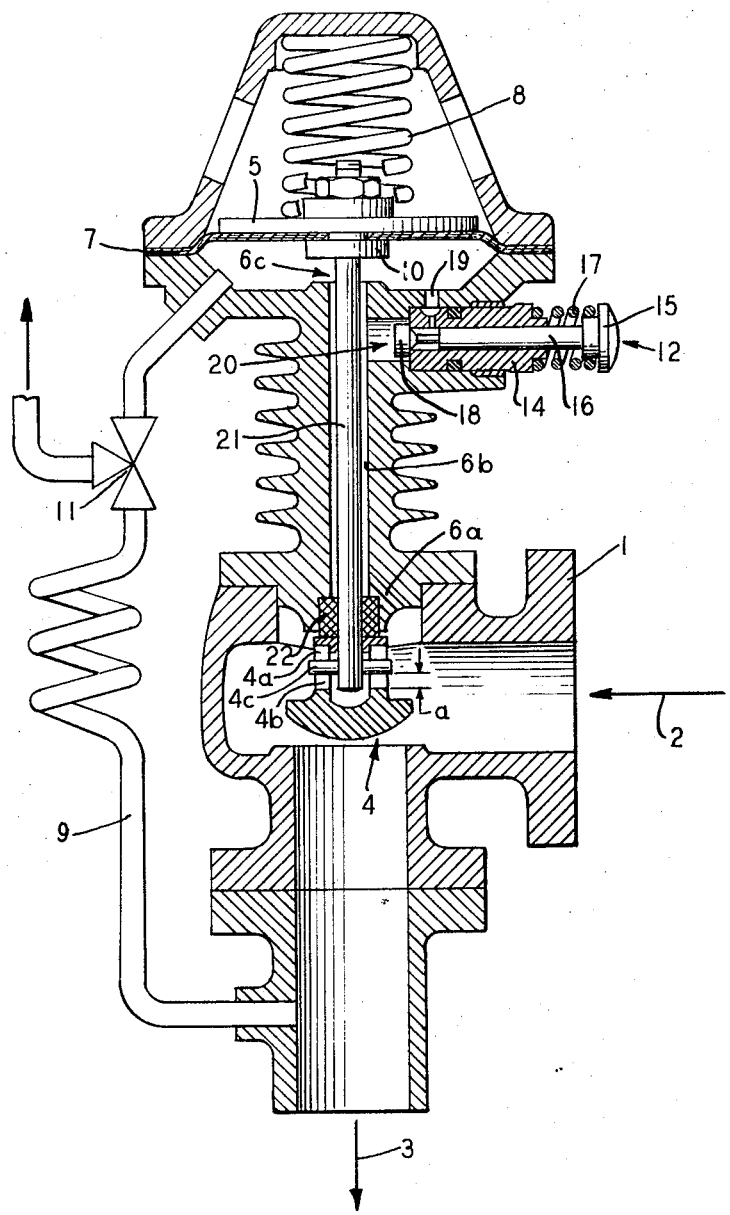

HIGH SPEED STOP VALVE

This invention relates to a high-speed stop valve for automatically closing a pipe — particularly a pipe conducting liquid oxygen — in the event of a sudden pressure collapse in said pipe on the downstream side of the valve.

Pumps for liquid oxygen have recently found an expanding field of applications. Unfortunately the use of such pumps always introduces a fire hazard because materials that are incombustible in contact with oxygen do not exist. In view of the low temperatures at which these pumps operate, materials must naturally be used which do not completely lose their ductility at extremely low temperatures. This limits the choice of suitable materials to aluminum, bronze and stainless steel. Although, generally speaking, these materials are fairly safe, they will nevertheless also burn if an unforeseen accident causes a given ignition temperature to be exceeded.

The occurrence of such an accident due to a defect in the pump or due to the ingress of foreign matter is always a possibility, and because of their violence the fires which may then occur are very dangerous. In certain circumstances such fires may have the character of an explosion which leads to the destruction of the pump or of the associated pipes. It is nearly always impossible to extinguish such a fire by closing the stop valve because this becomes inaccessible through the flames.

It is the object of the present invention to provide a high-speed stop valve which in the event of a fire will safely and automatically close and thus permit the fire to be quenched by cutting off the further supply of oxygen.

According to the invention this is achieved by the provision of a closure member which is coupled to an actuating member of which one side is continuously acted upon by an elastic means urging it in a direction for closing the closure member, whereas the opposite side of the actuating member communicates with a pipe section on the upstream side as well as with a pipe section on the downstream side of the closure member, the communicating connection to the pipe section on the upstream side containing at least one throttling constriction so that when said pipe becomes defective the pressure acting on the side of the actuating member facing away from the elastic means substantially collapses and thus allows the closure member to be moved into closing position.

An embodiment of the invention will now be described, by way of example, with reference to the accompanying drawing, the single FIGURE of which is a sectional view through H valve in accordance with the invention.

Referring to the drawing, liquid oxygen from a storage vessel (not shown) enters the body 1 of a high-speed stop valve at 2. The oxygen leaves the valve and flows via a main outlet pipe, as indicated at 3, to a pump (not shown). A valve plug 4 is kept in open position by a flexible membrane 5. The oxygen in the body 1 of the valve, which at the pressure existing in the storage vessel also flows through a constricted duct 6a and a long narrow annular passage 6b, enters a chamber 7 underneath the membrane. While flowing through the long passage 6b the oxygen evaporates and in chamber 7 it is in the gaseous state and nearly at room temperature, but its pressure is still the same as that of the liquid oxygen inside the valve body 1. This pressure keeps the valve open against the thrust of a closing spring 8. Moreover, a pipe 9 connects the chamber 7 to the outlet pipe downstream of the valve. Under normal operating conditions the pressure in the outlet pipe is the same as that in the entry pipe and there is therefore no flow through the connecting pipe 9.

Assuming now that the pump on the main outlet pipe is destroyed by fire or by an explosion, the liquid oxygen would then escape to the outside at 3 and its pressure would therefore collapse. Consequently the chamber 7 underneath the membrane would quickly be exhausted through the pipe 9 and the valve 4 rapidly closed by the thrust of the spring 8. This closing action is further assisted by the flow of the medium leaving the chamber.

During the closing movement more oxygen will naturally pass through the throttling constriction 6a and enter the chamber 7 through the passage 6b. However, since the bore of the duct 6a is very small, this inflowing oxygen will not be sufficient to prevent the closing of the valve.

As soon as the valve has closed the further supply of oxygen to the chamber 7 is stopped by a collar 10 on the stem 21 of the valve plug 4 closing the upper annular outlet 6c of the annular passage 6b. This collar therefore constitutes an auxiliary valve controlling the outlet from the annular passage 6b. Consequently the valve, once it has closed, cannot reopen. In order to permit the valve plug 4 and the auxiliary valve 10 to close simultaneously the valve plug 4 is axially movably attached to its stem 21. It will be understood from the drawing that the stem 21 extends from above into a sleeve 4a which forms part of the valve plug 4 and which is attached to the plug by a key 4c which slidably engages a slot 4b. A seal 22 separates the annular passage 6b from the main passage of flow through the valve.

The described valve provides a high degree of operational safety because its operation does not depend upon an extraneous controlling medium, such as compressed air or electricity, which might occasionally fail. Moreover, the valve contains no stuffing boxes or glands which could ice up or jam, and even a deformation of the pipe or of the valve body cannot affect the functioning of the valve.

The connecting pipe 9 may incorporate a three-way valve 11 which optionally permits the chamber 7 to be connected to atmosphere and the valve made to respond. Actuation of the three-way valve 11 therefore enables the valve to be closed when desired and the three-way valve thus takes the place of the stop valve.

Instead of the manually operable three-way valve 11, a servo-operated valve of conventional kind may be provided. The connection to atmosphere can then be opened by any desired remote control means, for instance operated by the release of a dead man's handle or whenever prescribed pressure and temperature limits are exceeded. Equipment for remote control is obtainable in the trade and forms no part of the present invention.

When the valve has responded to the operation of the three-way valve 11 it will remain in closed position until the three-way valve 11 is again restored to its normal position in which it establishes communication with the main outlet pipe. Even when this has been done, the auxiliary valve 10 will not yet open until the chamber 7 is briefly placed in communication with the interior of the valve body 1. This can be done by depressing a push-button valve 12 which immediately recloses upon being released. The push button valve 12, which is fitted into a transverse bore in the valve body 1, comprises an axially bored plug 14 which contains a displaceable valve stem 16 carrying a push button 15. A spring 17 keeps the valve stem in the illustrated position in which the end of the bore remote from the push button is closed by a valve disc 18. The axial bore in the plug 14 communicates with the chamber 7 through a radial duct 19. When the push button 15 is pressed the pressure medium in the annular passage 6b can flow through a port 20 and the radial duct 19 into the chamber 7 and lift the membrane 5 carrying the auxiliary valve 10. The high-speed stop valve will then stay open again, the auxiliary valve 10 being raised from its seat and uncovering the connection from the constricted duct 6a through the annular passage 6b to the chamber 7.

The described arrangement is suitable also for gases other than oxygen, although the want of such a valve has been most severely felt in the case of oxygen. Moreover, instead of being constructed in the manner of an angle valve, as illustrated in the drawing, the valve may be designed as a straight-through valve or as a valve with an angled seating.

The membrane 5 may be replaced by some alternative actuating member, such as a piston movable between two end positions.

Furthermore, instead of a poppet type valve 4 some other type of valve, such as a piston valve, could be used.

We claim:

1. A high-speed valve for automatically closing a pipe in the event the pressure in the medium flowing through the valve suddenly collapses on the downstream side of the valve, comprising a closure member coupled to an actuating member, elastic means acting on said actuating member and urging it in a direction for closing the closure member, means to oppose the urging of the elastic means including a first communicating passage means connecting said actuating member with a pipe section on the upstream side of the closure means, a second communicating passage means connecting said actuating member with a pipe section on the downstream side of the closure member, the first communicating passage means maintaining open communication between the upstream pipe section and the closure member while said closure member is in the normal open position, said first passage means including at least one throttling constriction so that when said pressure collapse occurs the pressure acting on the side of the actuating member opposing the elastic means substantially collapses and thus allows the closure member to be moved into closing position, means responsive to the last mentioned movement to close the first passage means.

2. A high-speed valve according to claim 1, in which the elastic means comprises a coil spring, the closure member comprises a valve plug and the actuating member comprises an elastic membrane rigidly connected to a stem of the valve plug.

3. A high-speed valve according to claim 2, in which the second passage means includes a three-way valve which permits the side of the membrane exposed to the medium to be connected to atmosphere and the closure of the valve plug.

4. A high-speed valve, according to claim 1, in which the first passage means includes a push-button valve which when depressed permits the medium to reach the membrane, and which, when released, is closed by a spring.

5. A high-speed stop valve according to claim 2, in which the first passage means comprises an annular passage concentrically surrounding said valve stem and communicating with said upstream pipe section through said throttling constriction, said responsive means including an auxiliary valve on said stem which closes said annular passage when said closure member is moved into a closed position.

6. A high-speed stop valve for automatically closing a pipe in the event of a sudden pressure collapse in the pipe comprising a closure member coupled to an actuating member, elastic means acting upon said actuating member and urging it in a direction for closing the closure member, a first passage means connecting said actuating member with the upstream side of the closure member, a second passage means connecting said actuating member with the downstream side of the closure member, said first and second passage means normally communicating pipe pressure to oppose the urging of the elastic means and maintain said closure member in an open position, said first passage means having at least one throttling constriction so that when said pipe develops a sudden pressure collapse the pressure opposing the urging of the elastic means will substantially collapse and thus allow the closure member to be moved into a closing position, and means responsive to the last mentioned movement to close the first passage means.

* * * * *